P. H. THOMAS.
LIGHTNING ARRESTER.
APPLICATION FILED JUNE 7, 1905.
978,959.
Patented Dec. 20, 1910.
4 SHEETS—SHEET 1.
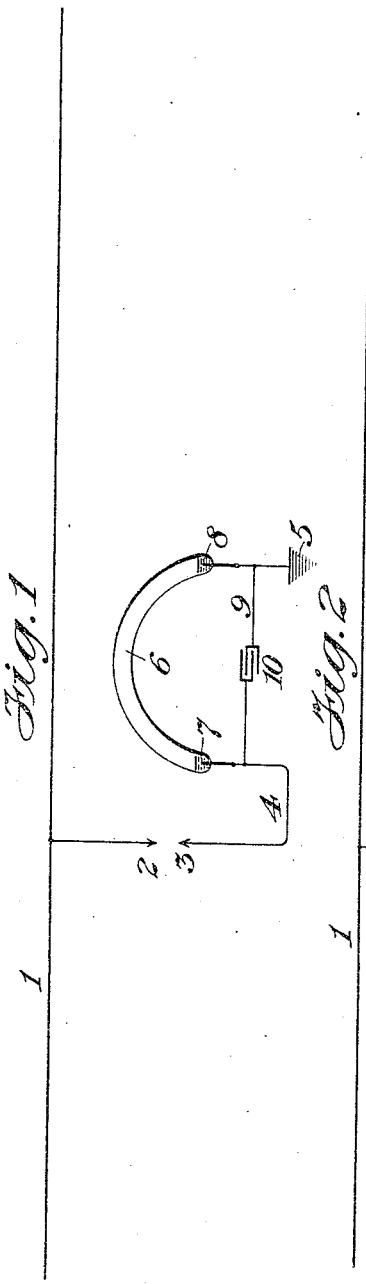
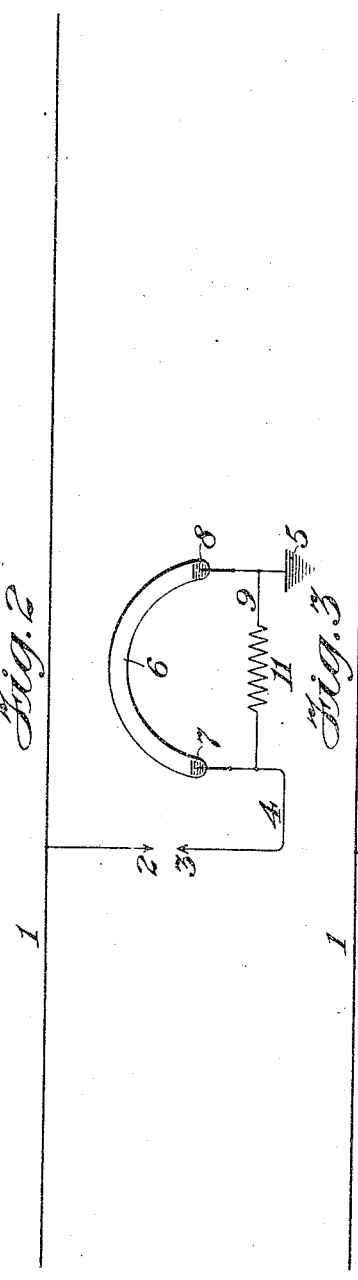
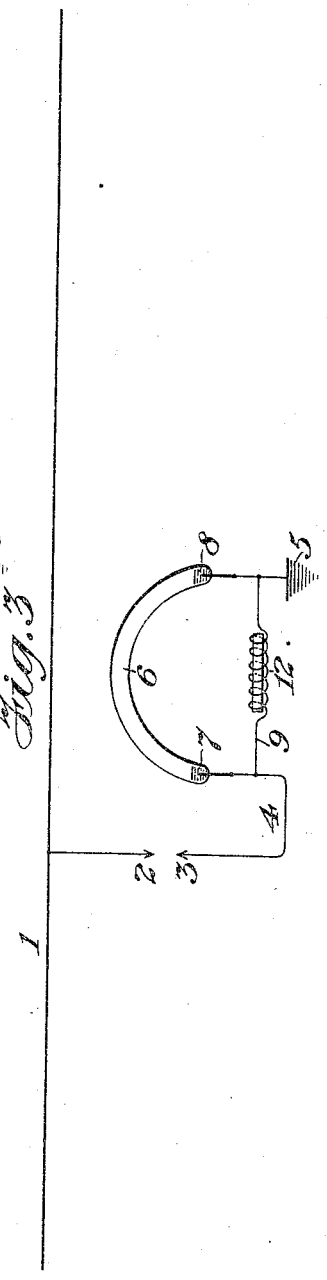

P. H. THOMAS.
LIGHTNING ARRESTER.
APPLICATION FILED JUNE 7, 1905.
978,959.
Patented Dec. 20, 1910.
4 SHEETS—SHEET 2.
Fig. 4.
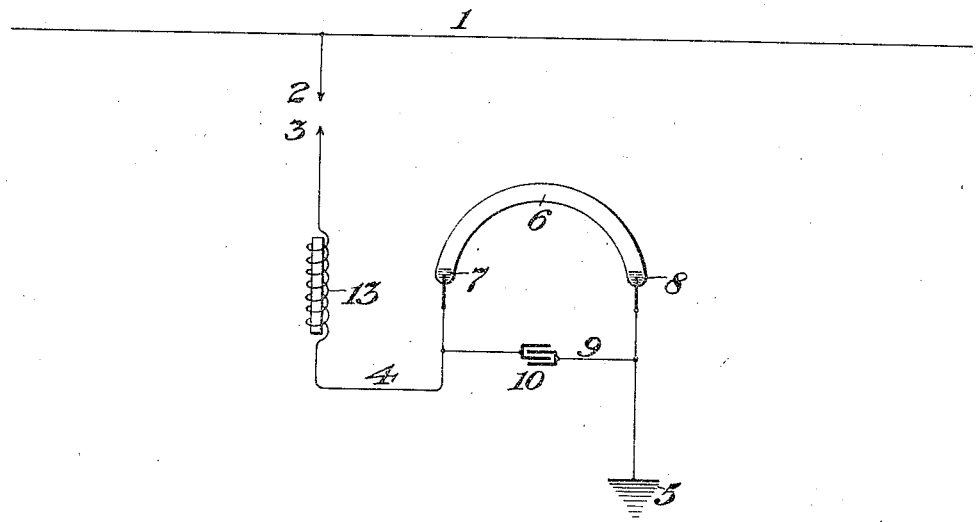
Fig. 5ª
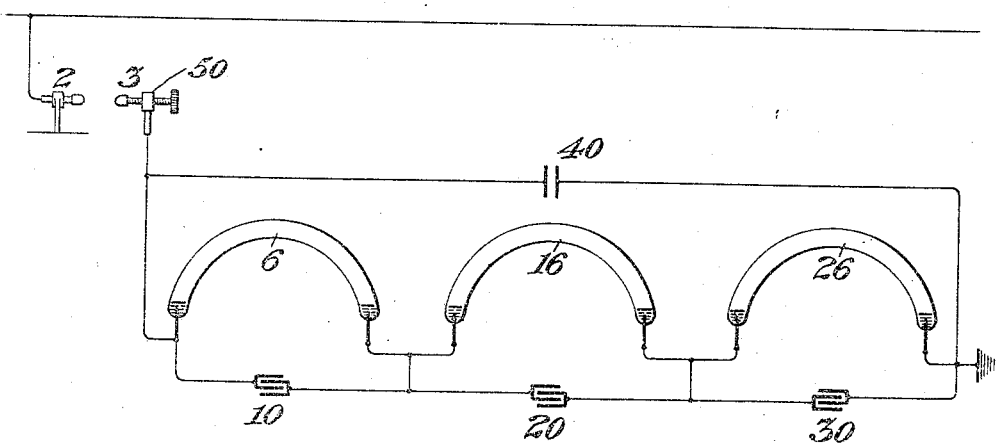
WITNESSES
Chas. J. Clagett
Thos. H. Brown
INVENTOR
Percy H. Thomas
BY
Charles A. Terry
ATTORNEYS

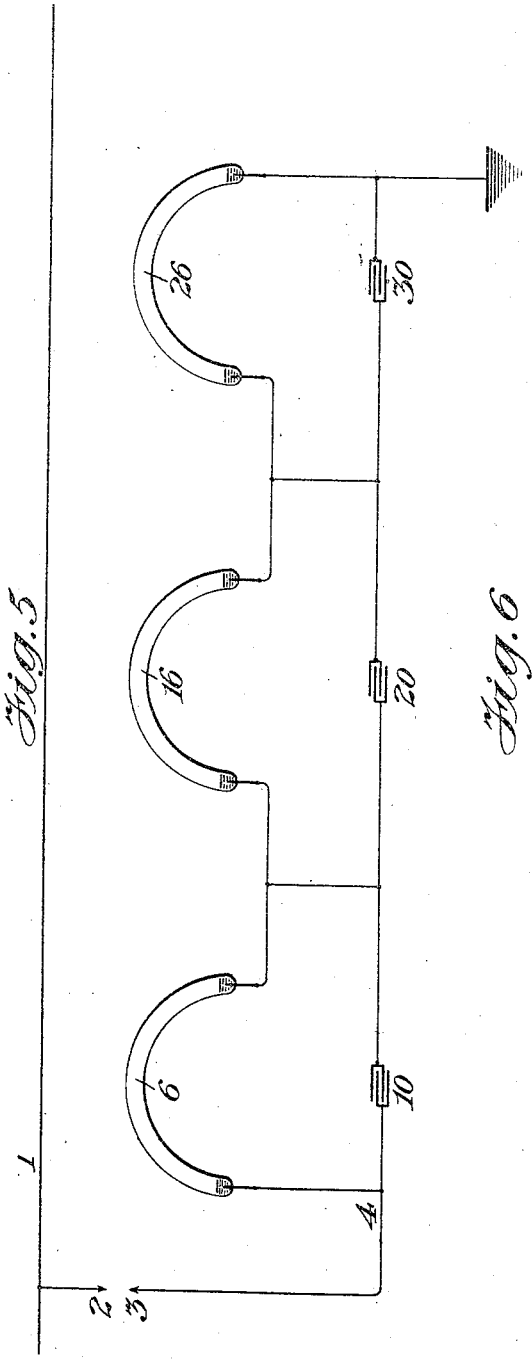
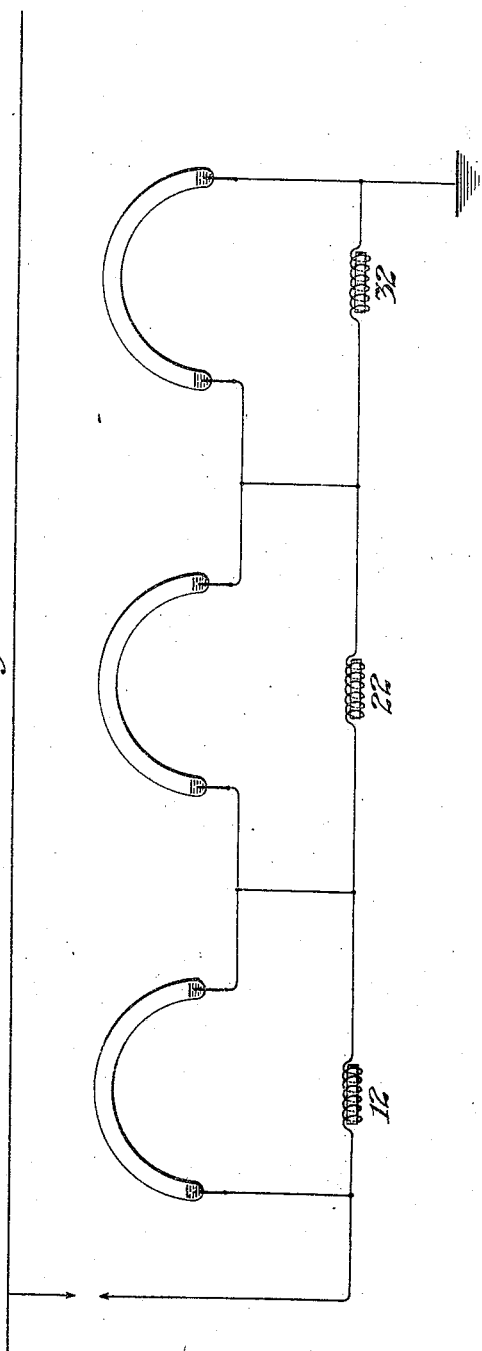

P. H. THOMAS.
LIGHTNING ARRESTER.
APPLICATION FILED JUNE 7, 1905.
978,959.
Patented Dec. 20, 1910.
4 SHEETS—SHEET 4.
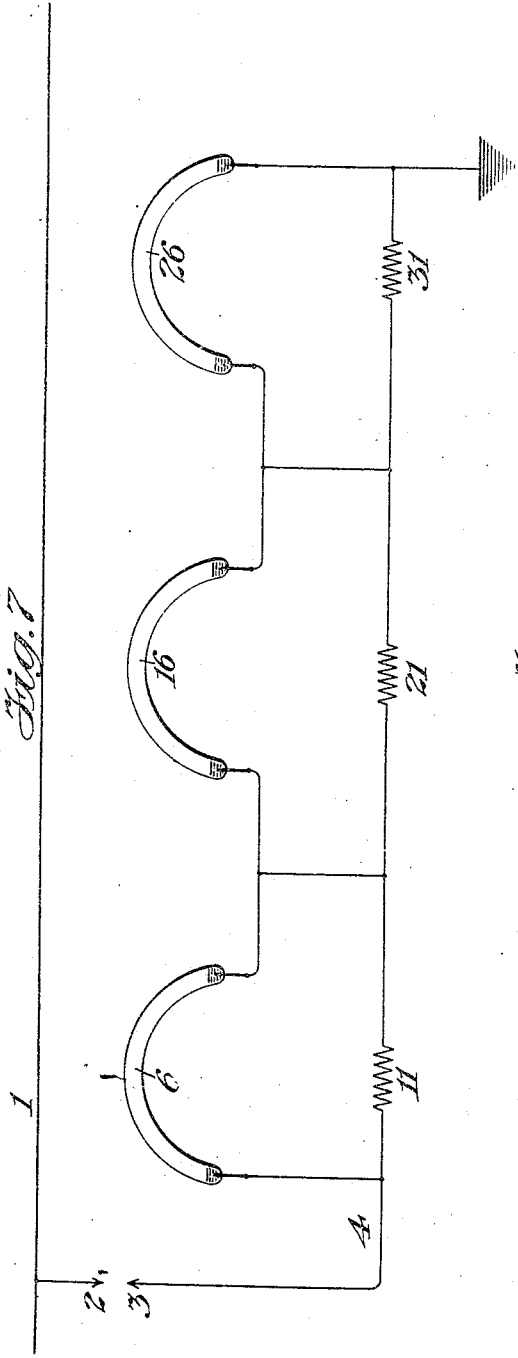
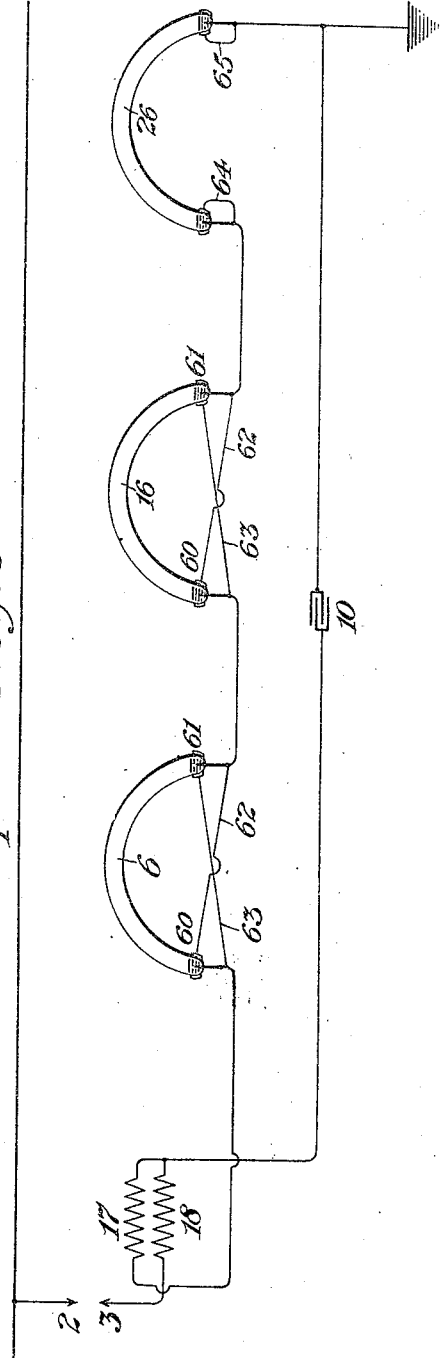
Witnesses
Chas. F. Clagett
Thos. W. Brown
Inventor
Percy H. Thomas
By his Attorney
Charles A. Terry

UNITED STATES PATENT OFFICE.

PERCY H. THOMAS, OF MONTCLAIR, NEW JERSEY, ASSIGNOR TO COOPER HEWITT ELECTRIC COMPANY, OF NEW YORK, N. Y., A CORPORATION OF NEW YORK.

LIGHTNING-ARRESTER.

978,959.  Specification of Letters Patent.  Patented Dec. 20, 1910.

Application filed June 7, 1905.   Serial No. 264,057.

*To all whom it may concern:*

Be it known that I, PERCY H. THOMAS, a citizen of the United States, and resident of Montclair, county of Essex, State of New Jersey, have invented certain new and useful Improvements in Lightning-Arresters, of which the following is a specification.

The present invention relates to improvements in lightning arresters.

It is well understood that the lightning arrester should be adapted in the first instance to resist the normal line voltage and to place the lines in connection with the earth upon a rise of potential on the line to an abnormal or dangerous limit. This function is very well performed by an air gap or a number of small air gaps placed between the line and the ground. There is, however, another function which should belong to a successful lightning arrester and that is the function of interrupting the current which tends to follow a discharge to ground, such current being supported by the generator itself. This last named function is only indifferently performed by many types of lightning arrester and the danger always exists of a leak being established between the line and the ground by a discharge of abnormally high potential.

It has been proposed to utilize as a lightning arrester, particularly in the case of alternating current circuits, a vapor apparatus such as is typified by the well known mercury vacuum vapor device. In utilizing this device, however, by simply interposing it between the line and the ground, it is found that the device is somewhat lacking in adaptability by reason of the difficulty of adjusting it reliably to a variety of line voltages. That is to say, it is not readily possible to adapt the vapor device mentioned to the function of permitting an earth discharge on the occurrence of a predetermined increase of voltage on the line. On the other hand, the capacity of the mercury vapor device for preventing the maintenance of a current from line to ground through the vapor apparatus belongs to the device by virtue of one of its marked characteristics. At the same time the known characteristics of the air gap can be quite safely relied upon in determining the discharge voltage of the line.

I propose to make use of the advantages of both the air gap and the mercury vapor device by connecting such devices in series between the line and the ground. In connection with such a combination, I have found that there is a considerable number of useful adjuncts which render the apparatus more adaptable to commercial circuits as will be fully described hereinafter. For example, I may place a resistance or choke coil, or a condenser or other suitable form of capacity, in shunt to the mercury vapor device, thus throwing practically all the potential on the spark gap, and I may further use a number of vapor devices in series where the line voltage is so high as to exceed the practical breaking down voltage of a single vapor device. Even in such a case as that last mentioned, it is generally desirable to use also a series spark gap and one or more shunt choke coils, condensers or resistances. An advantage of the use of these shunting devices is that the line voltage is removed from the vapor device or devices at all times except during a discharge. And further the advantage that the shunting devices cause a discharge voltage to be first impressed upon the air-gap before its break down takes place and thereafter upon the vapor device in virtue of the drop of potential across the shunt devices, until the former breaks down, when there is a free discharge throughout the apparatus. Furthermore, in case it is difficult to make vapor devices sufficiently sensitive and accurate for a particular case, it is possible to increase the margin of adaptability of the vapor device by providing a choke coil or transformer, or equivalent means, which will cause a sudden rise of potential upon the vapor device at the time of a discharge from the line. It will thus be seen that the chief function given to the vapor device in the organization described is that of interrupting the circuit after a discharge. Consequently this device may be used in connection with any lightning arrester either as an adjunct or for replacing the current rupturing portions of such lightning arrester.

When a vapor electric apparatus is used as indicated herein on alternating current circuits, it is evident that after a discharge takes place through the device, current will continue to flow without opposition therefrom, thus fully discharging the line, until the voltage is reduced to zero. Thereupon, since the device is designed to have a breaking down point higher than the normal voltage, unless a voltage greater than the line voltage of the device is applied, no further current flow through the device will take place in either direction. This follows since the negative electrode resistance, having once become established after the discharge, will prevent any further flow of current until broken down by an abnormal voltage, as in the first instance. If, however, the line has not by this time been completely discharged, the excess voltage will cause a second discharge through the device and so on until the normal voltage is restored.

My invention is illustrated in Figures 1, 2, 3, 4, 5, 6, 7 and 8 of the drawing which are diagrammatic views illustrating different embodiments of my invention.

In Fig. 1, the line is shown at 1 and a spark gap having terminals 2 and 3 is shown in a circuit, 4, connected to ground at 5. Interposed in the circuit between the element 3 and the ground is a mercury vapor device, 6, having electrodes 7 and 8, which will usually be of mercury, although one of the electrodes may be of solid material, such as iron. Across the circuit between the terminals of the vapor device is arranged a circuit, 9, containing a condenser, 10.

The organization shown in Fig. 1 operates as already described in the opening paragraphs of this specification.

In Fig. 2 the condenser 10 is replaced by a resistance 11 and in Fig. 3 a reactance device, 12, is substituted for the condenser.

In Figs. 1, 2 and 3, the current translating device in shunt to the vapor device serves to throw the free potential between the line 1 and the ground 5 upon the air gap 2—3, since the gap 2—3 allows no leakage current before break down, while the three types of translating devices of the Figs. 1, 2 and 3 allow an appreciable current flow at all voltages, thus maintaining the air gap terminal 3 at the potential of 5 when no current is passing through the gap 2—3.

In Fig. 4 a reactance device, 13, is placed in series with the vapor apparatus 6, and the condenser 10 is shown across the terminals of the said apparatus. It will be understood that the condenser may be replaced by either a resistance or a reactance as shown in Figs. 2 and 3. It is evident that the initial discharge through the air gap 2—3 in this figure will pass through the current translating device 10 in shunt to the vapor device 6 and that a certain amount of energy will be stored in the reactance device 13 which will, in general, at least, partially discharge itself upon the waning of the first discharge and cause a momentary rise of potential between the electrodes 7 and 8. When the current translating device is a condenser, this action becomes the abrupt charging of the condenser through a reactance which is well known to cause a momentary rise of potential in the condenser. Such rise of potential is obviously of advantage in allowing a more powerful vapor device 6 and securing its proper operation.

Fig. 5 shows a series of vapor devices 6, 16, and 26, connected between the spark-gap and ground. Condensers 10, 20 and 30, are symmetrically connected across the terminals of the respective vapor devices. In place of the condensers, resistances or reactances may be used as before. That is, in Fig. 6, the elements 12, 22, and 32 are reactances, shunt connected to the vapor device and in Fig. 7, the elements 11, 21, and 31 are resistances, similarly connected.

Fig. 5ª shows an arrangement similar to Fig. 5, except that in addition to the elements of the latter figure, a condenser, 40, is connected between the line terminal of the device 6 and the ground terminal of the device 26 and that the air gap 2—3 is made adjustable. In the figure, this is accomplished by mounting the terminal 3 by means of a thread and nut, 50, so that rotation advances or retards this terminal in the usual manner.

It is evident in Figs. 5, 5ª, 6, and 7, that if the physical characteristics of the vapor devices, which are connected in series, are made different that voltage passing the gap 2—3 will be unequally distributed between these vapor devices so that some one or more will tend to discharge before the others. After such initial discharge, greatly increased potential will be impressed upon the other devices and they will discharge in their turn. Thus, it is possible to use either a greater number in series when they are so proportioned as to have sufficiently different electrical properties to cause an irregular distribution of potential between them just previous to the discharge or a given apparatus caused to discharge at a lower voltage.

The form of circuits which would result from substituting reactances for the condensers shown in Fig. 5 is illustrated in Fig. 6 and the circuit which would result from substituting resistances in a similar manner is illustrated in Fig. 7.

Fig. 8 illustrates a modified form of circuits in which use is made of a transformer having a primary 18 in series with the initial discharge and a secondary 17 in series with the vapor devices 6, 16 and 26, but not in series with the initial discharge connected in such a manner that the discharge in passing through 18 tends to cause an increased potential upon the vapor devices 6, 16 and 26 above what would be experienced were the transformer not used. Thus it is possible to use vapor devices with a greater margin of safety than would otherwise be possible. I have shown at 60 and 61 starting bands applied to the vapor devices in proximity to the electrodes and cross connected as shown by means of wires 62 and 63. These starting bands may be used in connection with any of the vapor devices illustrated in the various figures of the drawings. In general, such devices are preferably employed, although it is not thought necessary to illustrate them in connection with all the figures of the drawing. In other cases, however, starting bands are not cross connected but are joined to the lead wires in immediate proximity thereto, as illustrated, for example, at the right in Fig. 8 by the wires 64 and 65. This prevents a weakening of the resisting power of the device due to the accidental electro-static fields in the neighborhood.

The discharge device illustrated by the elements 2 and 3 in the drawings may be made adjustable.

It may be noted in connection with the operation of this device that its function is to discharge freely the high frequency charges of electricity which are caused by lightning and which may be due either to direct discharge from the source of lightning or to charge accumulated on account of the electro-static capacity of the wire and discharge therefrom through the vapor devices while at the same time serving to interrupt the flow of the normal frequency current at the normal voltage of the line.

On account of the well-known nature of lightning, the general system of apparatus and circuits here described is equivalent to a high frequency discharge from a high tension condenser through an air-gap, representing the original lightning discharge, together with a secondary discharge of the whole or a portion of the original discharge through a second gap and vapor device corresponding to the air-gap and arc suppressing means of the above lightning arresters. The latter apparatus would, of course, serve the same purpose and act in the same manner in connection with any artificially produced initial condenser discharge through a primary air-gap requiring a second discharge gap and arc suppressing device, such as is described in this invention.

I claim as my invention:—

1. The combination of an electric circuit carrying alternating current, a suitable ground, an air gap interposed in the ground circuit, a vapor device in said circuit, and means for causing a rise of potential above the discharge line voltage upon the vapor device as a result of any discharge across the gap.

2. The combination of an electric circuit carrying alternating current, a suitable ground, an air-gap interposed in the ground circuit, a suitable connection between said air-gap and the ground, a branch containing a vapor device, and a transforming device connected in the said connection and so related to the vapor device as to increase the potential applied to the said vapor device above that applied to the air gap.

3. The combination with an electric circuit carrying alternating current, a suitable ground, an air-gap interposed in the ground circuit, a vapor device in the said circuit, a choke coil in series with the spark-gap and the vapor device, and a capacity so connected with the choke coil that a discharge in the air-gap causes a surge rise of potential to be impressed upon the vapor device.

4. The combination of an electric circuit carrying alternating current, a suitable ground, an air-gap interposed in the ground circuit, vapor devices in the said circuit, and means for causing a variation between the breaking down points of the several vapor devices individually and collectively.

5. The combination with an electric circuit carrying alternating current, of a suitable ground, an air-gap interposed in the ground circuit, a plurality of vapor devices in said circuit having different electrical characteristics whereby the distribution of potential between them individually and between them and the spark-gap will not be uniform.

6. A vapor device in connection with an air gap as a lightning arrester, and vaporizable electrodes therefor, and a starting band coöperating with said electrode, together with means for abruptly applying a discharge to the starting band through the air gap.

Signed at New York, in the county of New York, and State of New York, this 2nd day of June A. D. 1904.

PERCY H. THOMAS.

Witnesses:
 WM. H. CAPEL,
 THOS. H. BROWN.